(No Model.)

B. F. HALDEMAN.
VEHICLE RUNNING GEAR.

No. 572,481.  Patented Dec. 1, 1896.

Witnesses:
H. E. Harrison
H. J. Levis

Inventor,
B. F. Haldeman
Per O. D. Levis
Att'y.

UNITED STATES PATENT OFFICE.

BENJAMIN F. HALDEMAN, OF PITTSBURG, PENNSYLVANIA.

VEHICLE RUNNING-GEAR.

SPECIFICATION forming part of Letters Patent No. 572,481, dated December 1, 1896.

Application filed March 23, 1896. Serial No. 584,508. (No model.)

*To all whom it may concern:*

Be it known that I, BENJAMIN F. HALDEMAN, of Pittsburg, in the county of Allegheny and State of Pennsylvania, have invented a new and useful Improvement in Wagon-Gears, of which the following is a specification.

It is the object of my invention to provide farm, coal, and other analogous wagons with an improved substitute for the rigid reach ordinarily used to connect the front and rear axles.

My invention is more particularly applicable to wagons having a rear platform-spring or which are otherwise so constructed that when loaded the axles are separated farther than normal. I employ an apparatus which combines the functions of tension or draft with that of a rigid brace between the axles, and it is constructed, arranged, and attached to a wagon-body and axles, as hereinafter described, and shown in accompanying drawings, in which—

Figure 1:
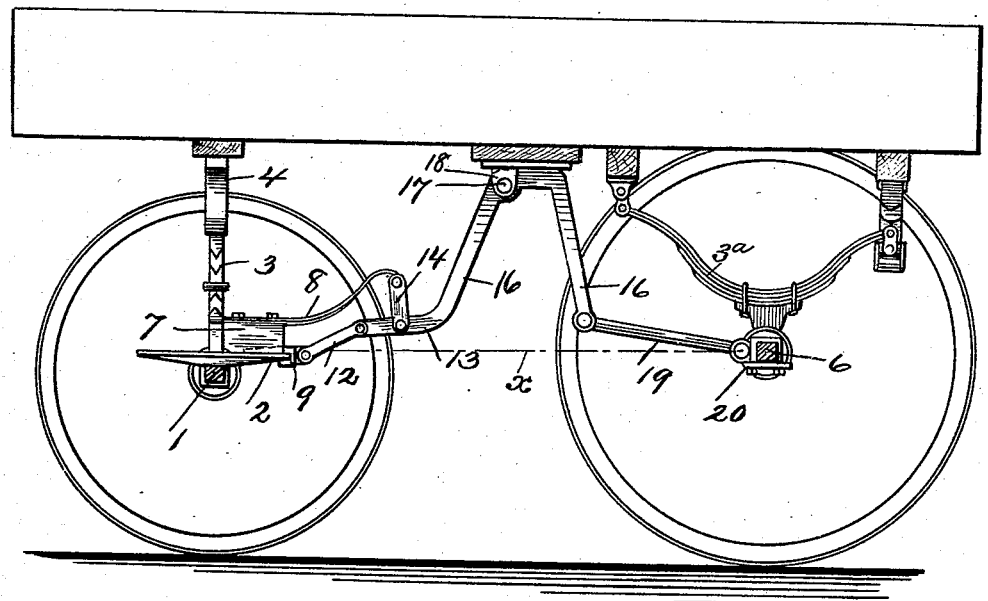
Figure 2:
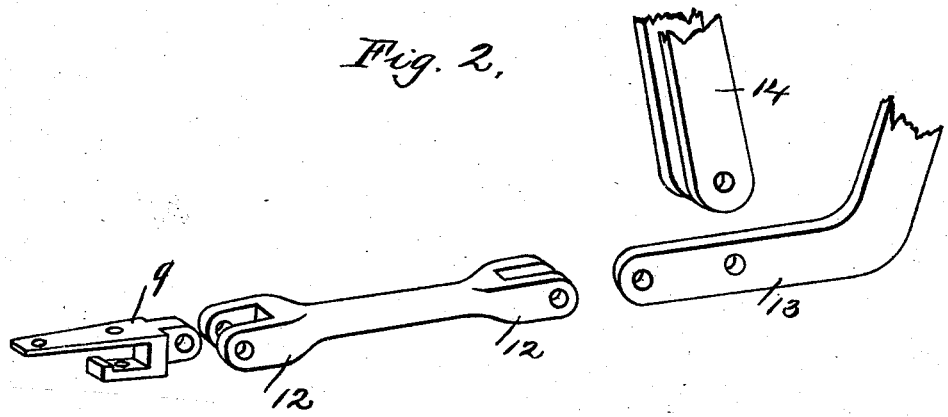

Figure 1 is a sectional view of a spring-wagon having my improvement applied. Fig. 2 is a perspective view of parts composing my improved apparatus.

The front axle 1 is provided with a fifth-wheel 2, and the rear axle 6 supports a platform-spring $3^a$. My apparatus consists of the bent lever 16 and pivoted links 12 and 19, which connect its ends with the respective axles 1 and 6. The lever 16 has practically an inverted-U shape, and is pivoted to a bracket 18, which is secured to the bottom of the wagon-body. It will be noted the pivotal point 17 is located at the forward end of the horizontal top portion of the lever, which is for a purpose hereinafter stated. The rear link 19 is jointed to a clip 20 on the rear axle 6, and the front link 12 is pivoted to the catch 9, forming part of the fifth-wheel proper. The wagon-body is supported normally at such height above the axles or the arms of the bent lever 16 have such length proportionate to the distance between the wagon-body and axles that the joints of the links and lever are above a straight line $x$, joining the axles.

It will now be seen that when draft is applied to the wagon the lever 16 and links 12 19 serve as a tension device and the lever oscillates on its pivot 17, thus avoiding undue strain on the wagon-body, and when the wagon is loaded and the rear spring $3^a$ yields backward the lever 16 moves down with the body, so that the relation of the parts as to tension remains practically the same. In other words, the tension apparatus practically adjusts and extends itself, since the links are brought down into or approach coincidence with the line $x$. Thus the lever and links constitute an adjustable tension device or reach, which adapts itself to all conditions of load and corresponding depression of the wagon-springs.

It will be further noted that the arrangement or location of the pivot 17 at the forward end of the horizontal top portion of the bent lever 16 enables the lever to rock or tilt as the wagon-body moves downward; but when the wagon is backed the lever does not tilt, but retains its normal position, as shown, since the top portion of the lever 16 in rear of its pivot 17 then bears upward against the wagon-body.

I thus provide a substitute for the rigid reach (ordinarily employed to connect axles) which may be manufactured and applied at much less cost, which is self-adjusting to the load of the wagon, and allows the front wheels to be turned under the body.

In connection with the lever and links, arranged as above described, I employ a plate-spring 8, which is bolted to a portion 7 of the fifth-wheel 2, its rear end being connected by a link 14 with the lever 16 at a point just in rear of the link 12. The chief functions of this spring are to aid in relieving the links of the effect of concussion when the wagon meets an obstruction and to aid in holding the fifth-wheel horizontal when a tongue or pole is rigidly attached to it.

What I claim is—

1. The combination, with a wagon, of the improved reach or tension apparatus, composed of a lever, having an upward bend and pivoted to the wagon-body at its angle, and links, pivoted to the pendent ends of said lever and connected with the front and rear axles, respectively, substantially as shown and described.

2. The combination, with a wagon, having a rear spring adapted to yield backward, of the improved adjustable reach or tension apparatus, composed of the inverted-U-shaped lever, attached at its angle to the wagon-body, and links, pivotally connected with the axles and pendent ends of the lever, which are normally above a straight line joining the axles, whereby, when the wagon-body is depressed, the links approach said line and thus practically lengthen the tension apparatus, as specified.

3. The combination, with a wagon having a rear spring adapted to yield backward, of a reach or tension apparatus composed of a lever arranged lengthwise of the wagon and having an upward bend and pivoted to the wagon-body at the front end of its top portion, links connected with the respective front and rear axles and the pendent ends of said lever which are normally above a straight line drawn between the axles, as and for the purpose specified.

4. The combination, with the wagon and the reach, or tension apparatus, composed of a lever and links connected with the rear axle and fifth-wheel, of a spring rigidly secured to the fifth-wheel and flexibly connected at its rear end with said lever, as shown and described.

In testimony whereof I affix my signature in presence of two witnesses.

BENJAMIN F. HALDEMAN.

Witnesses:
JAS. J. MCAFEE,
ALBERT J. WALKER.